United States Patent
Balamame et al.

(10) Patent No.: US 7,818,875 B2
(45) Date of Patent: Oct. 26, 2010

(54) METHOD OF MANUFACTURING A MAGNETIC HEAD WITH INTEGRATION OF A SMALL FLASH FIELD, ZERO BIAS, AND NON-REACTIVE ION MILLING FOR POLE TIP UNIFORMITY

(75) Inventors: Hamid Balamame, Palo Alto, CA (US); Daniel Wayne Bedell, Gilroy, CA (US); Mary Kathryn Gutberlet, Prunedale, CA (US); Clarence Kai-Sheng Hsieh, Santa Barbara, CA (US); Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 640 days.

(21) Appl. No.: 11/297,228

(22) Filed: Dec. 7, 2005

(65) Prior Publication Data

US 2007/0124917 A1    Jun. 7, 2007

(51) Int. Cl.
*G11B 5/187* (2006.01)

(52) U.S. Cl. .............. 29/603.15; 29/603.14; 29/603.12; 29/603.16; 29/603.18; 360/122; 427/131; 216/48; 216/192.34; 204/192.34

(58) Field of Classification Search .............. 29/603.07, 29/603.12, 603.13, 603.14, 603.15, 603.16, 29/603.18; 360/119.01, 122, 125.04, 125.17; 427/128, 131, 282; 430/5, 396; 216/2, 22, 216/48; 204/192.34
See application file for complete search history.

(56) References Cited

U.S. PATENT DOCUMENTS

| | | | | | |
|---|---|---|---|---|---|
| 3,661,436 | A | * | 5/1972 | Horwath et al. | 430/5 |
| 5,141,623 | A | * | 8/1992 | Cohen et al. | 216/22 X |
| 6,027,865 | A | * | 2/2000 | Andoh | 430/396 |
| 6,286,200 | B1 | | 9/2001 | Huang et al. | 29/603.12 |
| 6,329,211 | B1 | * | 12/2001 | Terunuma et al. | 29/603.15 X |
| 6,686,102 | B2 | | 2/2004 | Randall et al. | 430/5 |
| 6,723,252 | B1 | * | 4/2004 | Hsiao et al. | 216/22 |
| 2002/0181162 | A1 | | 12/2002 | Chen et al. | 360/317 |
| 2003/0202294 | A1 | | 10/2003 | Terunuma | 360/313 |
| 2004/0027716 | A1 | | 2/2004 | Chen et al. | 360/126 |
| 2004/0027729 | A1 | | 2/2004 | Lo et al. | 360/317 |

FOREIGN PATENT DOCUMENTS

| | | | |
|---|---|---|---|
| JP | 58-179921 | | 10/1983 |
| JP | 62-229513 | | 10/1987 |
| JP | 09-026584 | | 1/1997 |
| JP | 2005228447 A | * | 8/2005 |

* cited by examiner

Primary Examiner—A. Dexter Tugbang
(74) Attorney, Agent, or Firm—Zilka-Kotab, PC (57) ABSTRACT

A method of manufacturing a magnetic write head that provides improved pole critical dimension control, such as improved track width control (improved sigma) and improved flare point control. The method involves a combination of several process improvements, such as photolithographically patterning a P2 pole tip defining photoresist frame using a zero print bias and also using a small flash field. The method also involves the use of a non-reactive ion etch to notch the first pole (P1) using the second pole (P2) as a mask.

13 Claims, 13 Drawing Sheets

METHOD OF MANUFACTURING A MAGNETIC HEAD WITH INTEGRATION OF A SMALL FLASH FIELD, ZERO BIAS, AND NON-REACTIVE ION MILLING FOR POLE TIP UNIFORMITY

FIELD OF THE INVENTION

The present invention relates to the manufacture of a narrow track width write head for use in a magnetic data recording system, and more particularly to a method of manufacture that allows critical dimension tolerance control.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers continually seek ways to manufacture sensors and write heads having ever smaller dimensions. For example, increasing the number of tracks of data that can be fit onto a given area of magnetic medium requires decreasing the trackwidth of the write head. In order to decrease the trackwidth of a write head, the width of the write poles must be decreased.

As write head dimensions decrease, the resolution limits of conventional photolithographic techniques used to pattern and construct such write poles present limits to further size reduction. Therefore, there is a need for a method for constructing write heads having very small trackwidths that overcomes the limitations presented by previously used photolithographic techniques. Such a method would preferably make use of currently available manufacturing techniques in order to avoid adding significant additional cost to the manufacturing process.

SUMMARY OF THE INVENTION

The present invention provides a method for constructing a write head having improved dimension control (reduced sigma). The method involves first providing a wafer. A first magnetic layer is deposited on the wafer, followed by a nonmagnetic write gap material, electrically conductive P2 seed layer and then a photosensitive layer. The photosensitive layer is then photolithographically patterned using a tool that is configured to pattern the photosensitive layer using a zero print bias and a small flash field. A second layer can then be plated into an opening formed in the photosensitive layer. The photosensitive layer can then be lifted off and a non-reactive ion mill can be performed to notch the first magnetic layer, using the second magnetic layer as a mask.

The photosensitive layer can be, for example, photoresist, and can be lifted off by a chemical liftoff process. The non-magnetic gap layer can be, for example alumina, and can be sufficiently thin that the use of a non-reactive ion mill will not remove a significant amount of the second magnetic material layer (P2) during notching of the first magnetic layer P1.

The small flash field can be generated by using a stepper photo tool that has a lens and a mask, with the mask having an effective pattern area that has an area that is less than 25 percent of the area of the lens. For example, the mask may have an effective pattern area that is 10 to 30 percent of the lens area.

The zero bias point can be performed by configuring the stepper photo tool such that the size of a feature patterned on the mask is about the same size as the corresponding feature patterned on the photoresist layer. For example, the size of a feature on the mask can be 90 to 110 percent of the size of a corresponding feature on the photoresist layer.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
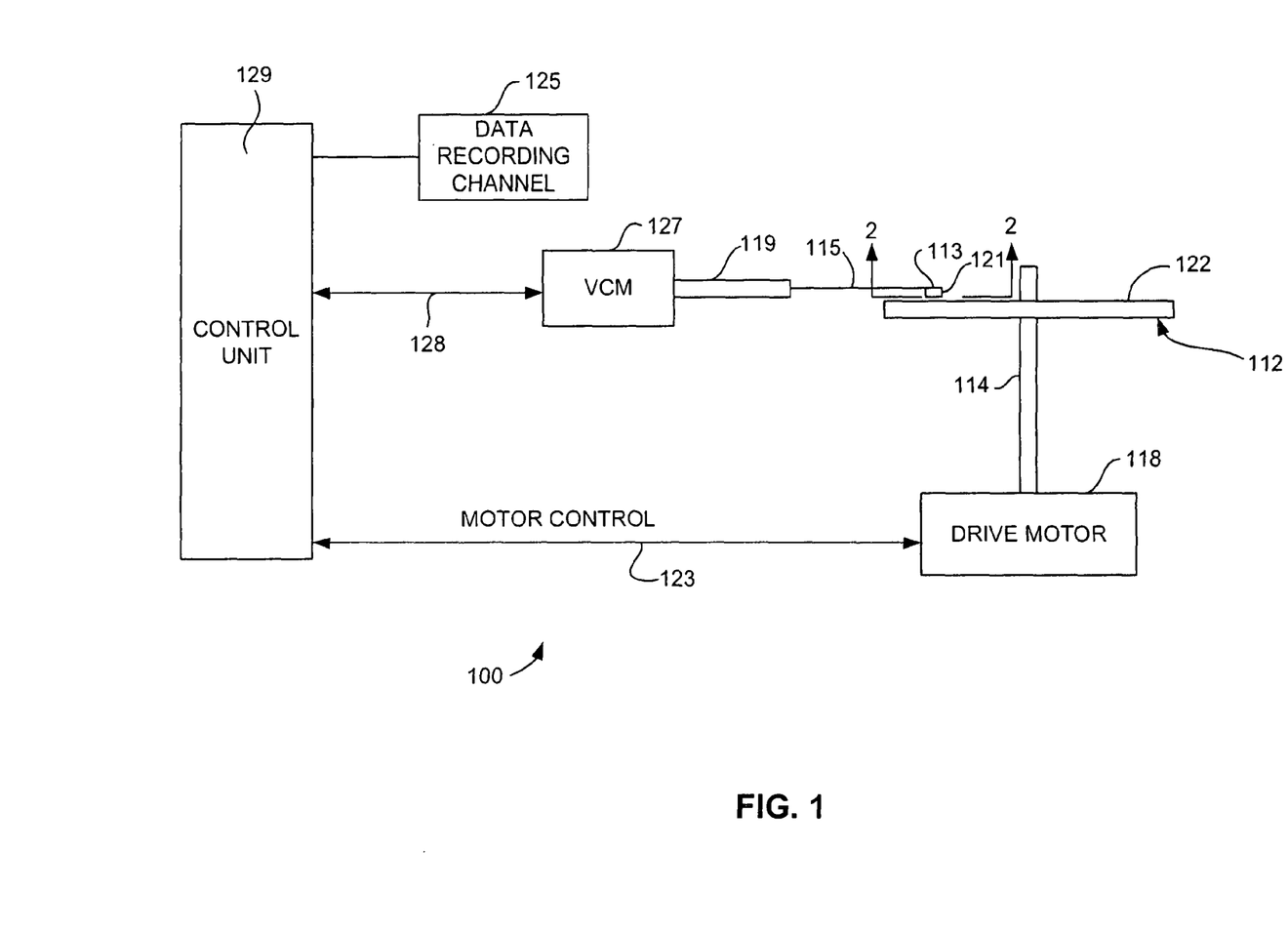
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
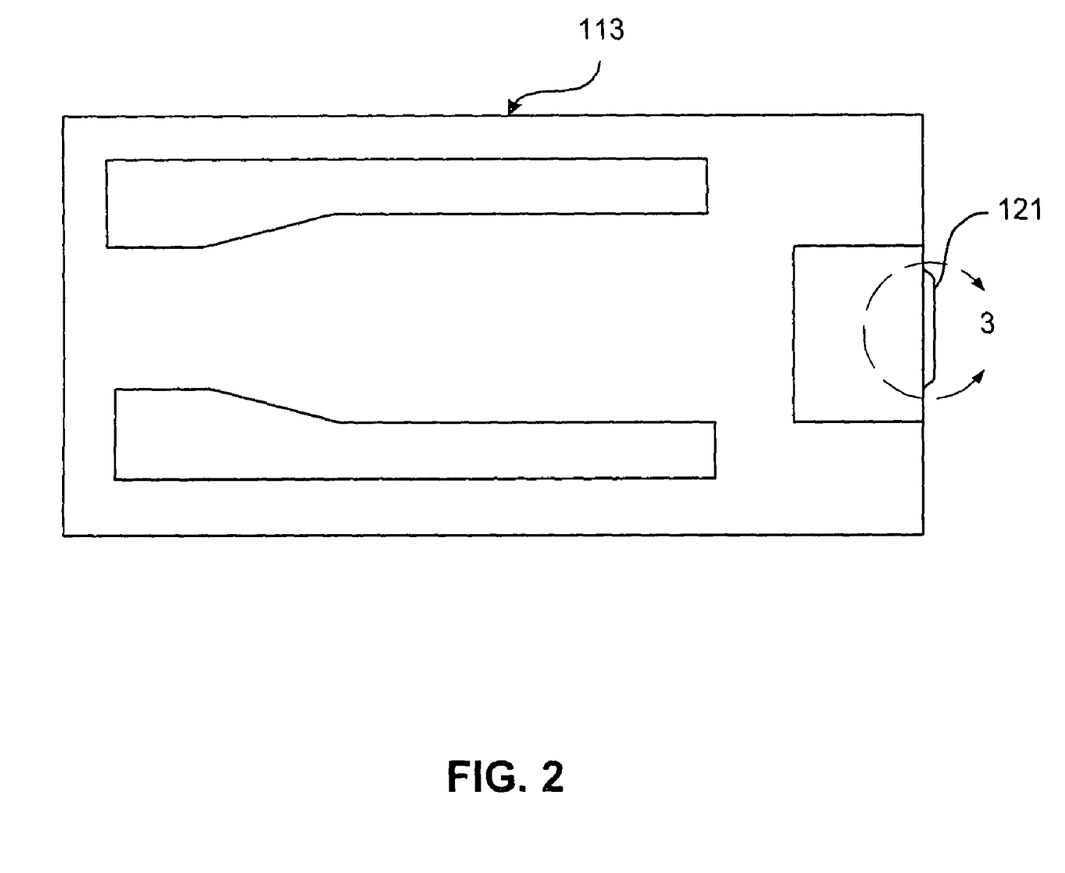
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
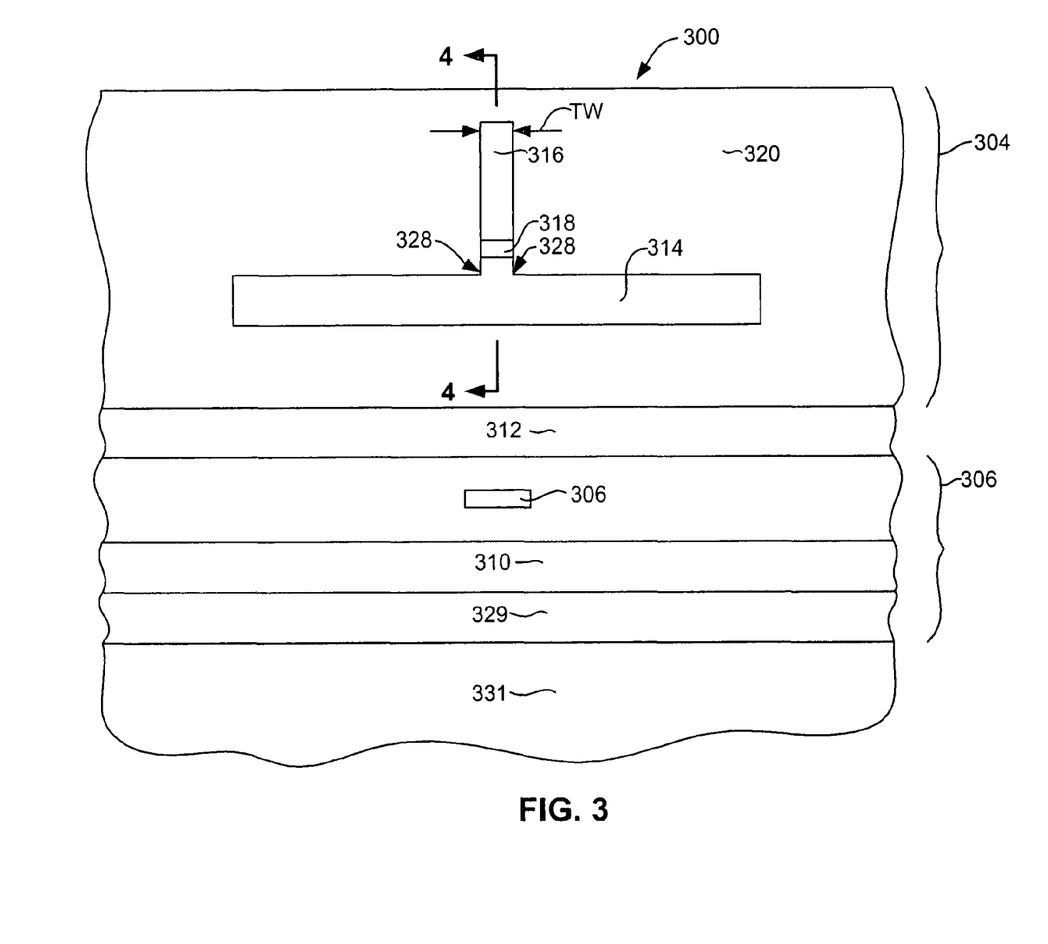
FIG. 3 is an ABS view of a magnetic head according to an embodiment of the present invention taken from circle 3 of FIG. 2 and rotated 90 degrees counter-clockwise.

With reference now to FIG. 3, magnetic head 300 for use in a data recording system is shown as viewed from the direction of the ABS. The head 300 includes a read head 302 and a write head 304. The read head includes a magnetoresistive sensor 306 embedded in a non-magnetic, electrically insulating gap layer 308 such as alumina. The read head 306 and insulation layer 308 are sandwiched between first and second magnetic shield layers. The write head 304 includes a bottom pole (P1) 314 and a top pole (P2) 316, both of which are constructed of a magnetic material such as NiFe or CoFe. A non-magnetic gap layer 318 is sandwiched between the first and second poles 314, 316. A non-magnetic fill layer 320 such as alumina surrounds the write poles 314, 316. The read and write heads 302, 304 may be constructed upon a non-magnetic, electrically insulating layer 329, which may be formed on a ceramic wafer material 331 such as TiC, Si or some other suitable material.

Figure 4:
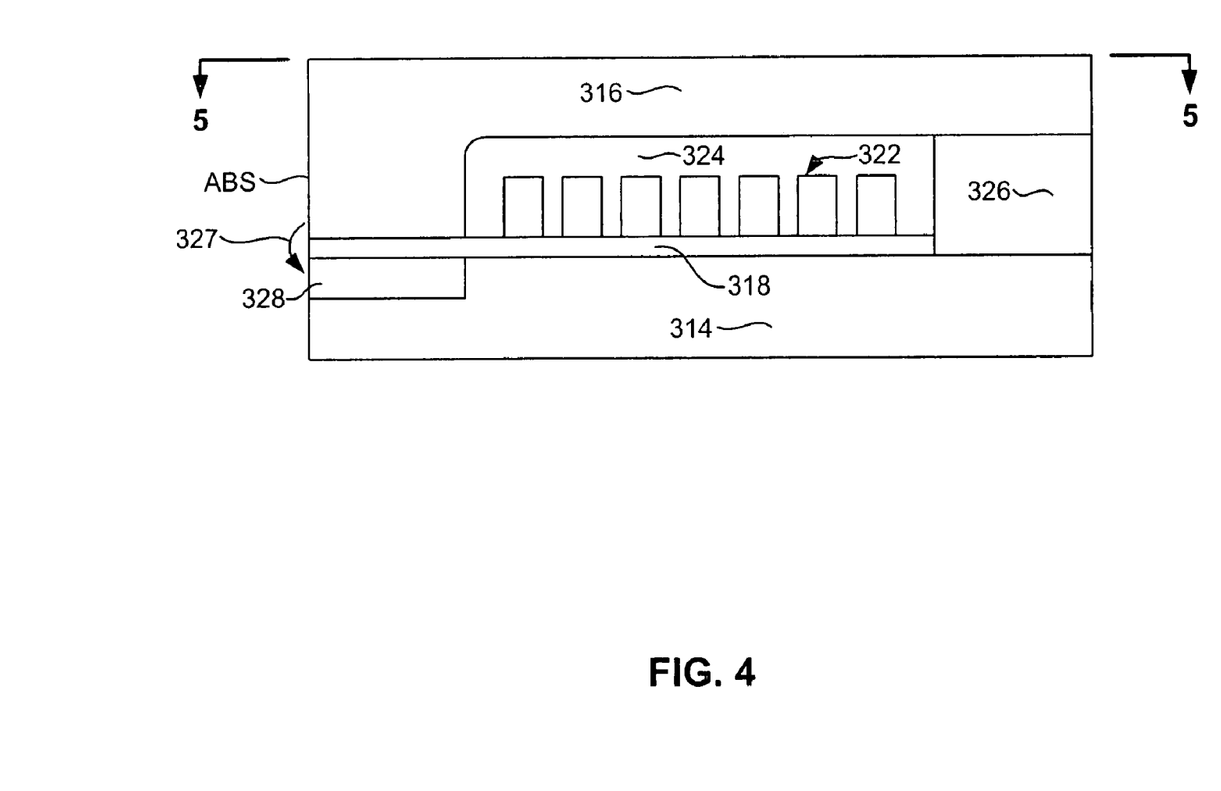
FIG. 4 is a cross sectional view of a magnetic write head taken from line 4-4 of FIG. 3.

With reference to FIG. 4, a cross section of the write head 304 shows that an electrically conductive coil 322 passes between the first and second poles 314, 316. The coil 322 may sit upon the write gap layer 318, and is surrounded by a fill layer 324 which may also be constructed of alumina or some other non-magnetic, electrically insulating material. A back gap 326 constructed of a magnetic material such as NiFe or CoFe magnetically connects the first and second poles 314, 316 in at the end opposite the ABS.

When a current flows through the coil 322 an magnetic field is generated, resulting in a magnetic flux flowing through the poles 314, 316 and back gap 326. This flux is interrupted at the write gap 318 at the ABS end of the write head 300 causing a fringing field 327 to extend from the end of the write pole. This fringing field writes a magnetic signal on an adjacent magnetic medium (not shown).

Figure 5:
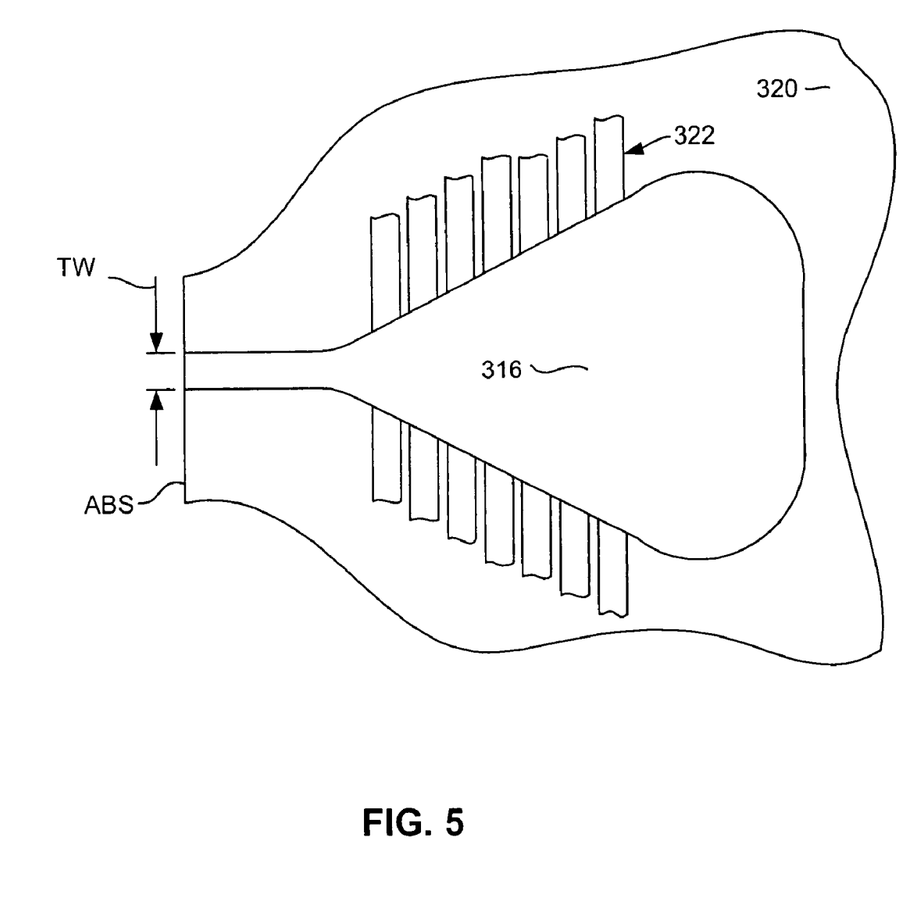
FIG. 5 is a top down view of a write head, taken from line 5-5 of FIG. 4.

With reference to FIG. 5, the shape of the top pole 316 can be seen more clearly. As can be seen the second pole narrows to a width TW near the ABS. This width TW defines the track width of the write head and is, therefore, a very critical dimension for the write head. In order to increase the number of tracks that can be written onto a given magnetic medium, it is desirable that the track width TW be as small as possible, while avoiding magnetic saturation of the magnetic pole 316 during use. As can be seen with reference to FIG. 3, the track width TW of the top pole 316 extends to a notch 328 in the first pole 314. This self aligned structure maximizes write head performance while preventing side reading and is constructed by a method that will be described below.

Figure 6:
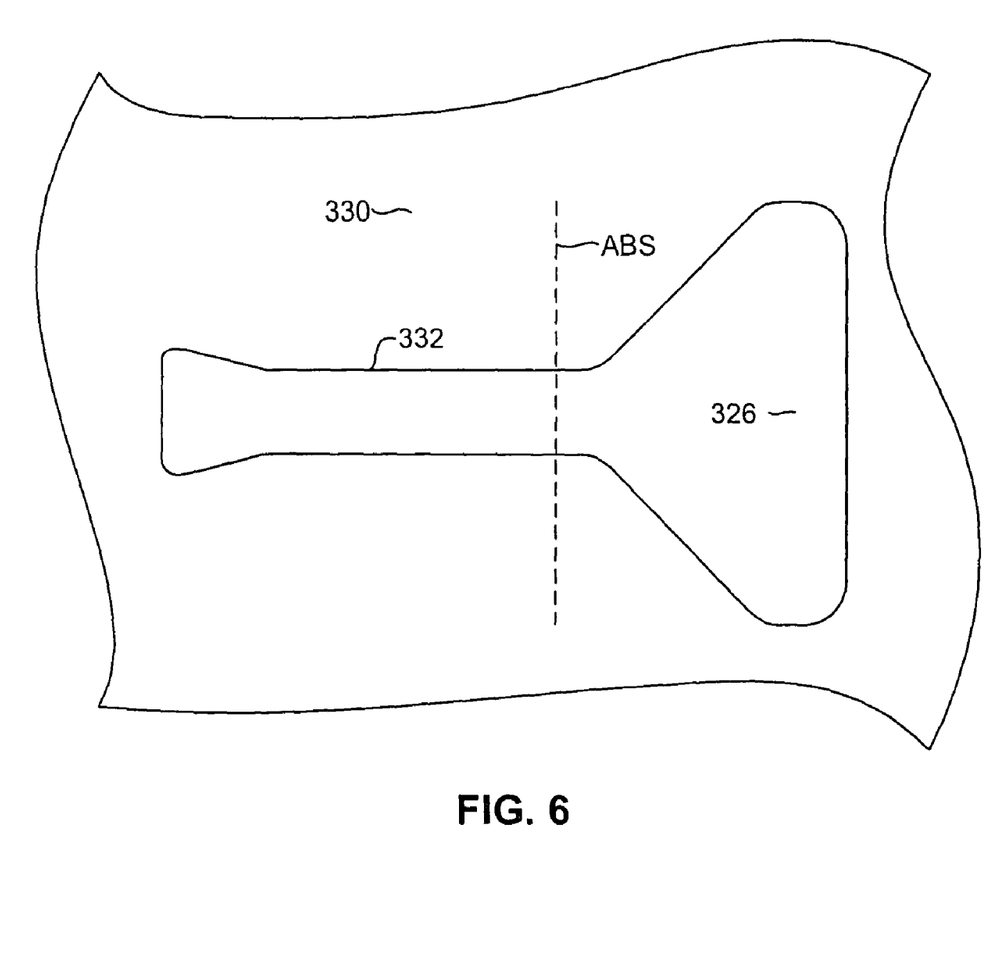
FIG. 6 is a top down view of a write pole of a write head, shown in an intermediate stage of manufacture.

With reference now to FIG. 4, the write pole 316 is constructed on a wafer 330 only a small portion of which is represented in FIG. 6, by a photolithographic and plating process that will be described in greater detail below. The write pole 316 is initially constructed to have an extended portion 332. The extended portion 332 is polished off by a lapping process after the wafer has been cut into rows of sliders (not shown), which removes material to the level of the ABS.

Figure 7:
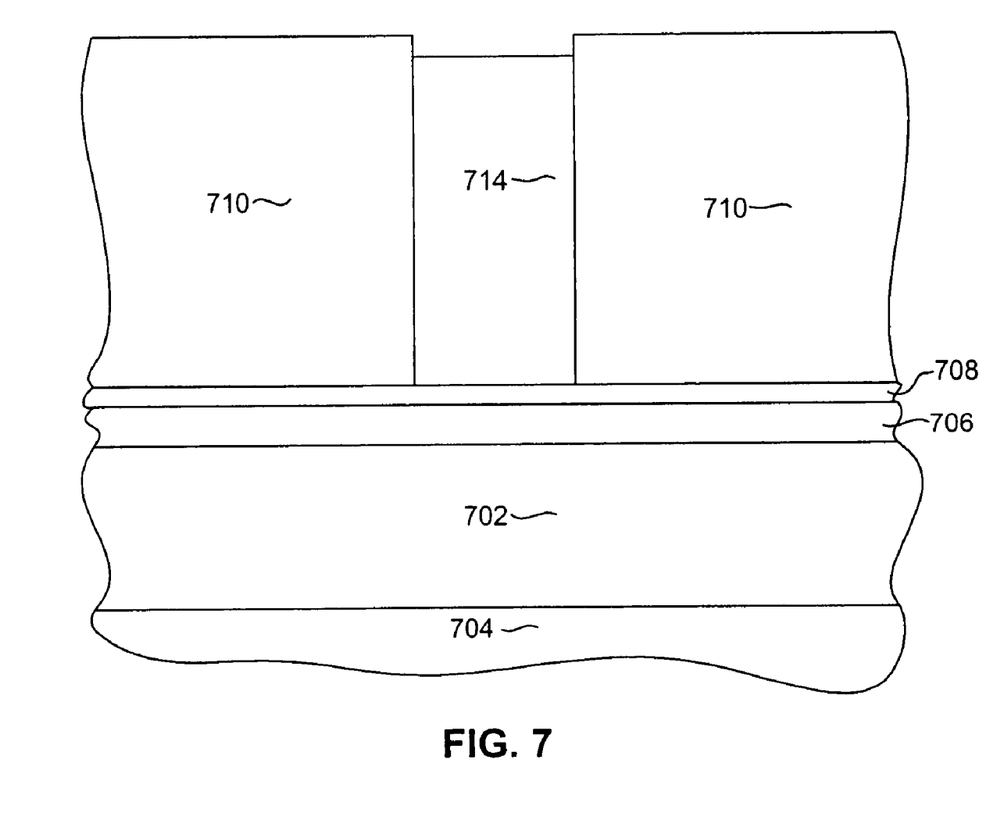
FIGS. 7-9 are ABS views of a write head in various intermediate stages of manufacture.
Figure 8:
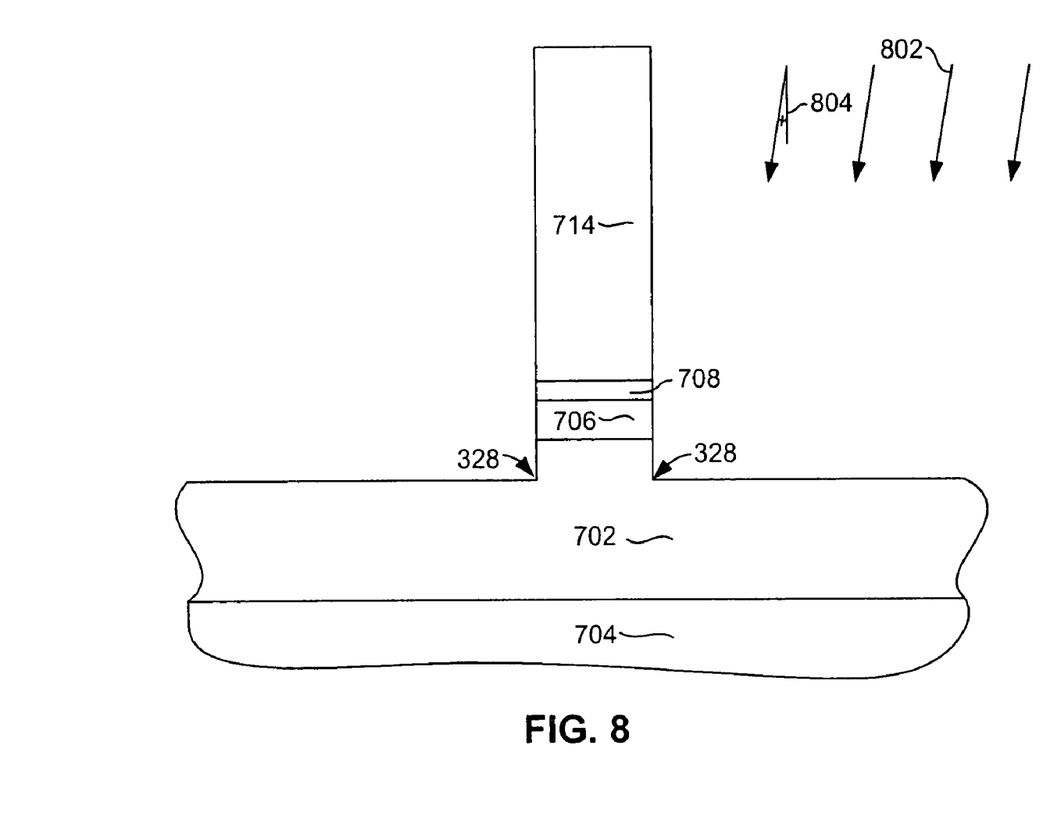
Figure 9:
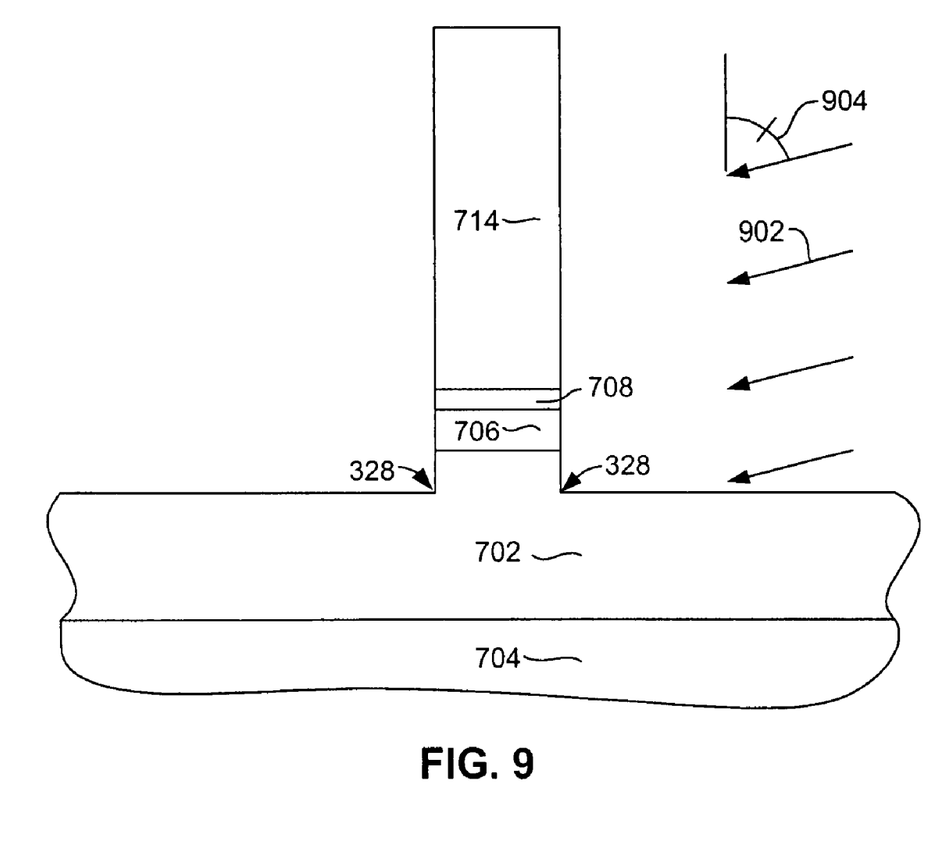

With reference now to FIGS. 7-9, a method for constructing a write head 304 (FIG. 304) according to an embodiment of the invention includes the use of a non-reactive ion mill to form a self aligned first pole notch. With particular reference to FIG. 7, a first magnetic pole layer 702 is deposited on top of a substrate 704 which may be, for example, alumina. A layer of write gap material 706 is deposited over the first pole layer (P1) 702. The write gap layer 706 can be constructed of, for example, alumina ($Al_2O_3$). An electrically conductive seed layer 708 is deposited on the write gap layer 706. A photoresist frame 710 is formed on the seed layer 708, the photoresist frame being formed with a trench 712. After the photoresist frame 710 has been constructed, a magnetic material 714 such as NiFe or CoFe can be electroplated to form the P1 structure.

As can be seen, the trench 714 defined by the photoresist frame 710, defines the width of the P2 structure 714. Accurate photolithography is, therefore, critical in order to construct a write head with a well defined track width. An improved photolithographic process for constructing the photoresist frame will be described in greater detail herein below.

Previously used methods for fabricating a longitudinal write head having an $Al_2O_3$ write gap and a notched first pole P1, have included the use of ion beam etching, also known as reactive ion milling. In such previously used methods the seed layer is removed, and then a reactive ion mill is performed in an atmosphere that includes Ar and CHF3 ions. The $CHF_3$ gas is used to preferentially remove the alumina ($Al_2O_3$) at a much faster rate (5:1 to 10:1) in order to minimize removal of the P2 pole during the notching process. After the notching, a cleanup must be performed, such as by ion milling in an Ar $O_2$ mixture. This method, however, has certain disadvantages. For example, to remove the polymeric residues, the ion source and the wafers need to be cleaned with an Ar/$O_2$ mill. Also, significant re-deposition material (redep) removal is needed after the gap removal. The uniformity using the $CHF_3$ gas is worse than with Ar gas only, and the ion mill tool needs to be dedicated to the above described process. Furthermore, the tool maintenance cost is higher with $CHF_3$ gap than with the use of Ar gas alone, and the tool uptime is two times shorter with the use of $CHF_3$ gas. While the above described milling process has the above described disadvantages, the alumina selectivity makes it desirable for use in a write head having a thick alumina write gap, such as those greater than 160 nm. This advantage seriously diminishes, however, when the write gap thickness is reduced.

With reference now to FIG. 8, the method for constructing a write according to the present invention especially useful for write heads having alumina write gaps thinner than 160 nm, and especially for write gaps having thicknesses of about 110 nm or less. Therefore, according to the present invention, a first non-reactive ion mill 802 in an Ar atmosphere (ie. no $CHF_3$) is performed. The first non-reactive ion mill is preferably performed at a nearly normal incidence. For instance, the first ion mill 802 can be performed at an angle 804 of 0-15 degrees with respect to a normal to the layers making up the write head. With reference to FIG. 9, a second non-reactive ion mill 902 is performed, this time a glancing angle to remove redep. The second ion mill 902 can be performed at an angle 904 of, for example, 85 to 90 degrees with respect to normal.

The use of the non-reactive ion milling 802, 902 described above provides several advantages. For example, when used with a thin alumina write gap it exhibits comparable NiFe top pole (P2) consumption as compared with a reactive ion mill. In addition, the non reactive ion mill provides improved track width uniformity. Furthermore, the non-reactive ion mill does not require the dedication of a tool as is needed in reactive ion mill process. The non-reactive ion mill reduces tool maintenance costs and improves tool uptime.

Figure 10:
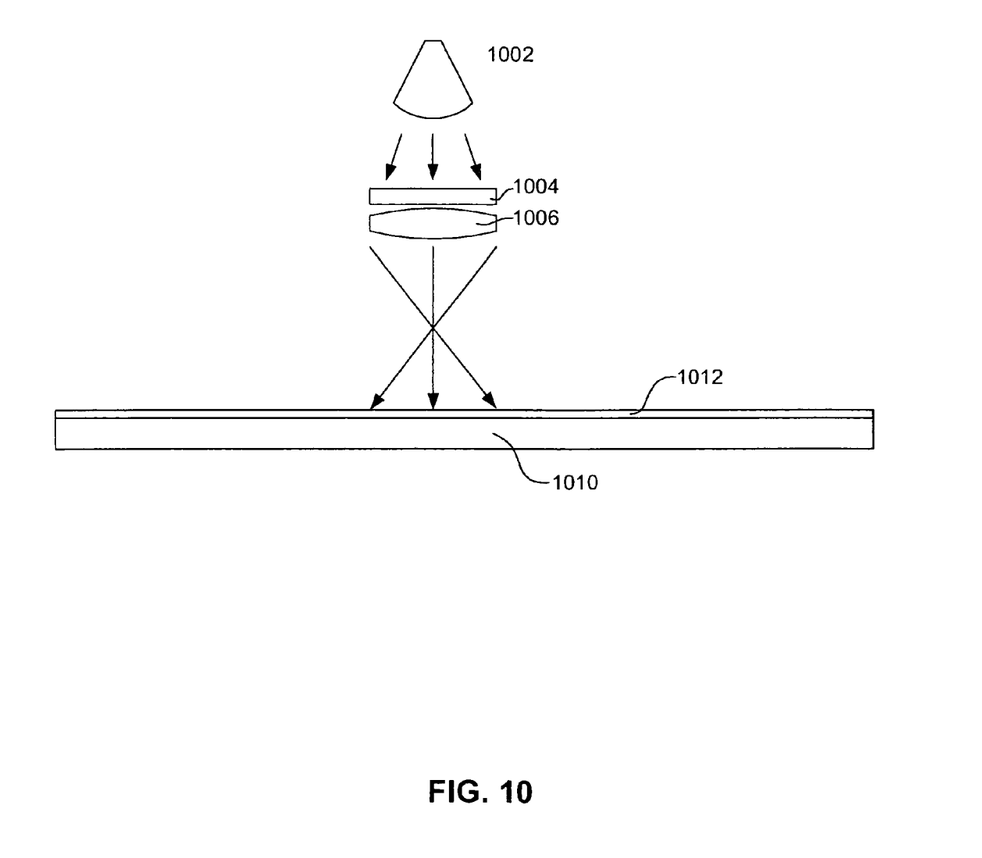
FIGS. 10-12 are schematic views illustrating a method of manufacturing a write head according to an embodiment of the invention.
Figure 11:
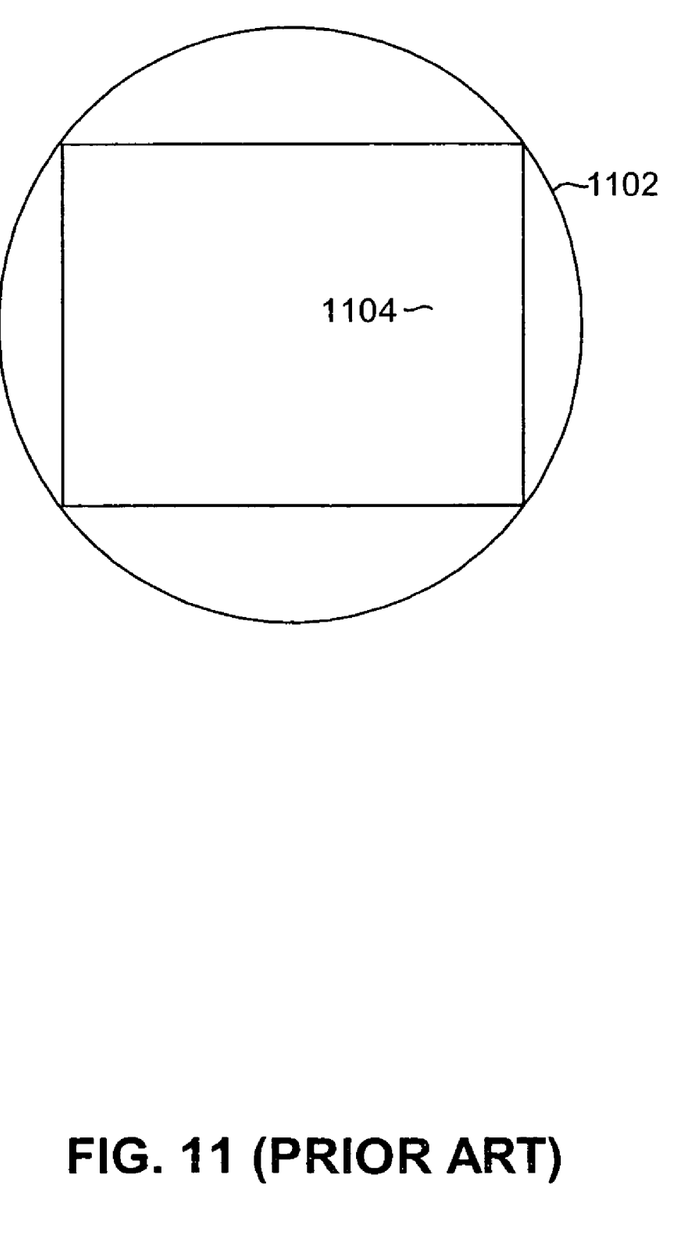
Figure 12:
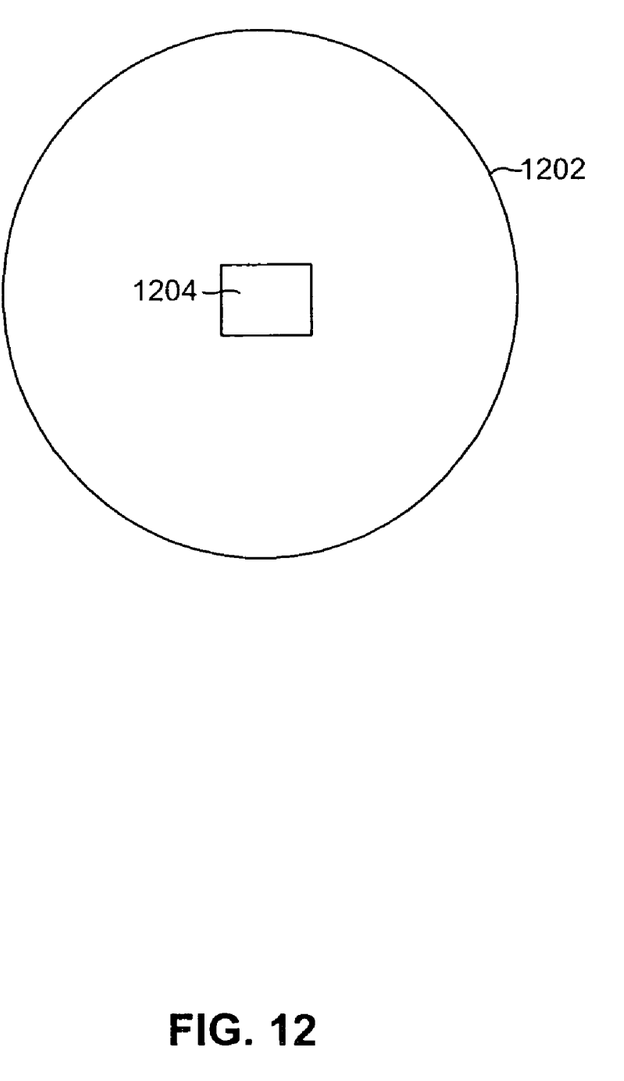

With reference now to FIGS. 10-12, construction of a write head according to an embodiment of the invention also includes the use of a small flash field to pattern a plurality of write heads onto a wafer. With particular reference to the schematic illustration of FIG. 10, the method includes the use of a light source 1002, a photo mask 1004, and a lens 1006 for focusing the light 1008 from the light source 1002 onto a wafer 1010. The wafer 1010, may have a layer of material such as photoresist 1012, which is photolithographically patterned by the light 1008 according to a pattern on the mask 1004. The photolithographic patterning can be performed in a stepper tool, wherein a portion of the wafer (first pattern area) is patterned, and then the wafer is moved laterally to a new position where the pattern can be repeated on in a second pattern area which may be adjacent to the first pattern area. This process is repeated until a substantial portion of the wafer has been patterned.

In order to increase wafer throughput by decreasing the number of stepped patterns that must be made, wafers have generally been patterned by a mask 1004 having a pattern that covers as much of lens 1004 as possible. This allows each pattern to cover as much area on the wafer as possible during each exposure. For instance, as shown in FIG. 11, a prior art mask 1102 may have an effective mask area 1104 that forms a substantially square pattern area that covers as much of the lens as is physically possible, thereby providing the largest possible flash field on a wafer 1010 (FIG. 10) to reduce the number of photo steps that must be performed. Areas outside of the effective pattern area 1102 are opaque.

With reference to FIG. 12, the present invention makes use of a mask 1202 having a relatively small mask pattern area 1204, which in turn forms a relatively small flash field on the wafer. While this increases the number of photo steps that must be performed, it provides a distinct advantage in reducing feature variation and improving control of critical dimensions such as track width. The use of a small flash field provides this improvement by only using a small area of the lens. The small effective mask area 1204 can be located near the center of the lens where the optical properties of the lens are most optimum and uniform. The size of the effective mask area can be, for example, an area that is about 10 to 30 percent of the total lens are or more preferably less than 25 percent of the total lens area. The use of the small flash field described above reduces stray light interference, thereby reducing critical dimension (CD) degradation.

Another feature of the invention, is that the photolithography is performed with a zero bias point. As those skilled in the art will appreciate, a photo process may be performed such that the feature printed on the wafer is larger than the feature on the mask itself (positive print bias). The process may also be performed such that the wafer feature is smaller than the mask feature (negative print bias).

For process stability, prior art photolithographic processes for this application have used positive print biases. However, the use of a positive print bias also requires a higher light dose. For example, a typical write pole is defined using a photoresist layer that is about 5 um thick. A positive print bias requires a light dose that is more than 50% higher than the light does that would be required using a zero print bias. This higher light does leads to deformation of the flare portion of the write pole and degradation of the P2 wall angle and trackwidth control. It also leads to shadowing during the ion mill process used to form pole structure, and further degradation of the final dimensions of the P2 pole 316. The higher light also worsens lens stray light, which increases the size of critical dimensions of the P2 pole structure 316, such as the track width in the field center and field area near adjacent fields, further degrading P2 sigma.

The use of a zero print bias has been found to avoid the above-mentioned problems associated with a positive print bias. A zero print bias is achieved in a photolithographic process wherein the size of the mask features is about equal to the size of the features defined on the wafer. For example, using a zero print bias the features on the wafer can be 90 to 110 percent of the size of the features on the mask itself. The use of a zero print bias has been found to provide the perfect balance between (1) maintaining throughput by keeping the size of the printed image sufficiently large on the wafer and (2) avoiding the sigma degrading effects (such as stray light) exhibited by the use of a positive print bias.

We have found that the combination of the above manufacturing method improvements: (1) the use of non-reactive ion milling, (2) the use of a small flash field and (3) the use of a zero print bias provide an unexpectedly large improvement in sigma control when used in conjunction in a process to define a magnetic write head. This unexpectedly large result is a synergistic effect that is much larger than the sum of the individual effect from each of the process improvements. For example, a 20 percent improvement in sigma can be realized by the combination of these three process improvements.

In fact the standard, accepted manufacturing practices have taught away from the use of these techniques. The use of a small flash field has not been practiced because of the increased number of photo steps required. Similarly, the use of a zero print bias has not been preferred, because a positive print bias typically results in a more stable process. Also, the use of a non-reactive ion mill has not been preferred because of the belief that a reactive ion mill is necessary to prevent excessive P2 removal during milling. Therefore, the prior art and knowledge in the field actually teaches away from the present invention.

Figure 13:
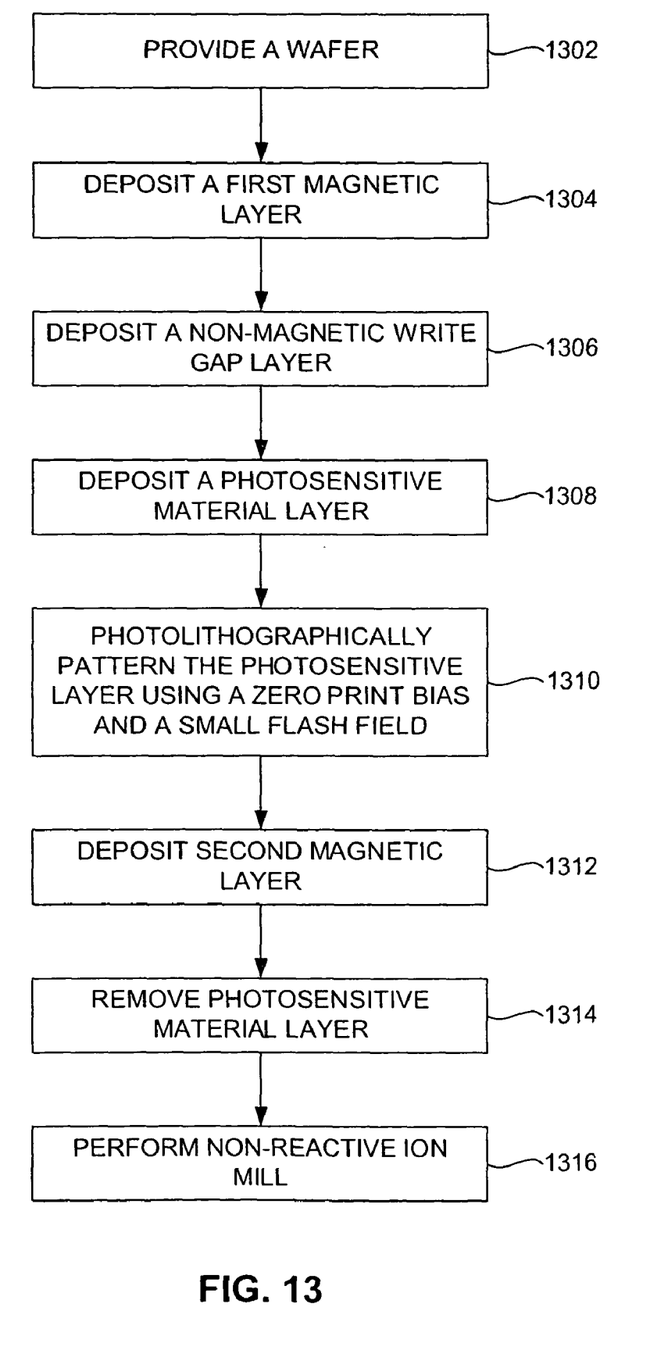
FIG. 13 is a process flowchart, illustrating a method of manufacturing a write head according to an embodiment of the invention.

With reference now to FIG. 13, a method for manufacturing a magnetic write head according to the present invention is summarized. In a step 1302 a wafer is provided. The wafer can be a Si wafer or, more preferably, a wafer comprising TiC. Then, in a step 1304, a first layer of magnetic material, such as NiFe or CoFe is deposited. This first layer can be formed in a desired first pole shape, by a method such as photoresist frame plating. In a step, 1306 a non-magnetic gap layer such as alumina ($Al_2O_3$) is deposited. Then, in a step 1308, a layer of photosensitive material such as photoresist is deposited.

With continued reference to FIG. 13, in a step 1310 the photosensitive layer is photolithographically patterned to form an opening in the photosensitive layer having a desired second pole (P2) shape. This photolithographic step is performed using a photolithographic stepper tool configured to define a small flash field on the wafer. The photolithographic tool is also configured to pattern the photosensitive layer with a zero print bias. In a step 1312 a second magnetic layer (P2) is deposited. The second magnetic layer can be deposited by electroplating, using the patterned photosensitive layer as frame to form the P2 structure. In order to facilitate electroplating, an electrically conductive seed layer may be deposited prior to depositing the photosensitive layer. In a step 1314, the photosensitive layer is removed, such as by a chemical liftoff process. Then, in a step, 1316, a non-reactive ion mill is performed to form a notch in the first magnetic layer, using the second magnetic layer (P2) as a mask to self align the notch with the P2 structure.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method of manufacturing a magnetic write head on a wafer, comprising:

providing a wafer;

depositing a first magnetic material on the wafer;

depositing a non-magnetic gap layer on the first magnetic material;

depositing a layer of photosensitive film over the non-magnetic gap layer; and photolithgraphically patterning the photosensitive film to form a desired pattern in the photosensitive film, the pattern including a trench formed in the photosensitive film, the photolithographic patterning of the photosensitive film being performed by a tool that includes a light source, a photo mask and a lens, and wherein;

the photo mask is patterned with an effective mask area to define a small flash field on the wafer during a photo step; and the tool is focused so as to pattern the photosensitive film with a pattern having a zero print bias;

depositing a second magnetic material into the trench formed in the photosensitive film;

removing the photosensitive film; and performing an ion mill on the first magnetic material, non-magnetic gap layer and the second magnetic, the ion mill impinging directly on an upper surface of the second magnetic material, the second magnetic material serving as a mask such that the ion mill removes a portion of the first magnetic material that is not beneath the second magnetic material, the ion mill being terminated before all of the first magnetic material has been removed, thereby forming a notch in the first magnetic material.

2. A method as in claim 1, wherein the lens defines a first area and the photo mask defines an effective mask area having an second area and wherein the second area is less than 25 percent of the first area.

3. A method as in claim 1, wherein the lens defines a first area and the photo mask defines an effective mask area having an second area and wherein the second area is 10 to 30 percent of the first area.

4. A method as in claim 1, wherein the tool is focused such that a feature defined in the photo mask patterns a corresponding feature on the wafer that is 90 to 110 percent of the size of the feature defined in the mask.

5. A method as in claim 1, wherein the tool is focused such that a mask feature having a first feature width patterns a corresponding feature on the wafer that has a second feature width that is 90 to 110 percent of the size of the first feature width.

6. A method as in claim 1 wherein the ion mill is first performed at an angle that is nearly normal to a surface of the wafer, and then performed at an angle that is glancing relative to the surface of the wafer.

7. A method as in claim 1 wherein the ion mill is first performed at and angle 0-15 degrees with respect to a normal to a surface of the wafer, and then is performed at an angle of 85 to 90 degrees with respect to a normal to the surface of the wafer.

8. A method as in claim 1 wherein the ion mill is performed in an atmosphere that comprises Ar.

9. A method as in claim 1 wherein the ion mill is performed in an atmosphere that consists of Ar.

10. A method as in claim 1 wherein the ion mill is performed in an atmosphere that includes Ar and is free of $CHF_3$.

11. A method as in claim 1 wherein the ion mill is performed sufficiently to form a notch in the first magnetic material that is self aligned with the a portion of the second magnetic material.

12. A method as in claim 1 further comprising, before depositing the photosensitive film, depositing an electrically conductive seed layer.

13. A method as in claim 1 wherein the photosensitive material comprises photoresist.

* * * * *